United States Patent [19]

Cooper

[11] Patent Number: 4,880,270
[45] Date of Patent: Nov. 14, 1989

[54] WORK STATION SYSTEM

[76] Inventor: Lloyd G. B. Cooper, 3825 Redmont Rd., Birmingham, Ala. 35213

[21] Appl. No.: 261,525

[22] Filed: Oct. 24, 1988

Related U.S. Application Data

[63] Continuation-in-part of Ser. No. 934,970, Nov. 25, 1986, Pat. No. 4,779,922.

[51] Int. Cl.$^4$ ............................................. A47C 7/62
[52] U.S. Cl. ..................................... 297/188; 108/20; 248/917; 297/170; 297/174; 297/217; 297/325; 312/239
[58] Field of Search .............. 248/1 C, 1 B, 1 D, 1 E, 248/1 F, 1 H, 1 I, 1 A; 312/235 R, 239; 108/20; 297/170, 171, 174, 188, 217, 417, 411, 313, 325, 259

[56] References Cited

U.S. PATENT DOCUMENTS

| | | | |
|---|---|---|---|
| 1,469,928 | 10/1923 | Lazar | 297/217 X |
| 2,475,528 | 7/1949 | Strang et al. | 297/217 |
| 2,725,095 | 11/1955 | Rodefeld | 297/170 |
| 4,134,614 | 1/1979 | Fielding | 297/172 X |
| 4,408,800 | 10/1983 | Knapp | 297/347 X |
| 4,495,871 | 1/1985 | Negata et al. | 108/20 |

FOREIGN PATENT DOCUMENTS

| | | | |
|---|---|---|---|
| 2567378 | 1/1986 | France | 248/1 A |
| 302485 | 10/1954 | Switzerland | 312/235 R |
| 730745 | 5/1955 | United Kingdom | 297/217 |

*Primary Examiner*—James T. McCall
*Attorney, Agent, or Firm*—Griffin, Branigan & Butler

[57] ABSTRACT

A work station for ergonometrically supporting a human operator in a seated position while the human operates equipment located on the work station. A chair (12) has a first portion (12b) contactable by a thigh of the seated operator and a second portion (12c) contactable by the operator's back. The chair (12) is rockable about a horizontal axis of a main pivot shaft (28). A carriage (14) is secured proximate the front edge of the first portion (12b) of the chair (12). A surface for supporting an input device (16) and a surface for supporting a visual display device (18) are attached to the carriage (14). As the seated operator rocks about the horizontal axis of the shaft (28), the spatial distance between the surface for supporting an input device (16) and the seated operator remain essentially constant, as does the spatial distance between the surface for supporting the visual display (18) and the seated operator.

23 Claims, 18 Drawing Sheets

WORK STATION SYSTEM

BACKGROUND

This is a continuation-in-part application of application serial No. 06/934,970, filed Nov. 25, 1986, now U.S. Pat. No. 4,779,922.

I. Field of the Invention

The invention relates to furniture such as office furniture, and in particular relates to ergonometric work stations.

II. Prior Art and Other Considerations

Machine operators such as typist and video display terminal operators frequently complain that the nature and positioning of the work surface upon which their equipment is placed causes fatigue. In particular, at a conventional desk an operator must sit, perhaps for hours, with the operator's back being essentially vertical in relation to the floor. Sitting erect subjects an individual's back to an increased bending moment which is substantially larger than the bending moment which is placed on an individual's spine when the individual is standing erect. This increased spinal loading for extended periods of time leads to back injury. Also, it is not uncommon for a conventional desk to be either too high or too low for a particular operator. The effect of such problems is to reduce the productivity of the employee.

Consequently, effort has been directed towards developing improved work stations. More recently the ergonometric relationships between the user and a computer or video display terminal have been brought into consideration, primarily because of the unique problems facing this type of system usage.

Various prior art devices provide a work surface which is ultimately connected to a seat. For many of these devices it is not possible to adjust the positioning of the work surface, such as the angle of inclination of the work surface. For other devices it is not possible to selectively adjust the extent to which the seat reclines, much less to make such a seat adjustment while maintaining a constant spatial relationship between the work surface and the seated operator.

In view of the above, it is an object of the present invention to provide a work station wherein the spatial distance between a work surface and a seated operator remains essentially constant as a seat is selectively adjustable about a horizontal axis.

An advantage of the invention is the provision of a work station for which an operator can selectively adjust the height and angle of inclination of a plurality of support surfaces.

Another advantage of the invention is the provision of an adjustable arm support which permits an operator to rest his arms in a range of comfortable positions.

Another advantage of the present invention is the provision of a work station for which the positioning of a work surface relative to a chair can be adjusted to take into consideration the physical characteristics and preferences of an operator.

SUMMARY

A work station for ergonometrically supporting a human operator in a seated position while the human operates equipment located on the work station. A chair has a first portion contactable by a thigh of the seated operator and a second portion contactable by the operator's back. The chair is rockable about a horizontal axis of a main pivot shaft. A carriage is secured proximate the front edge of the first portion of the chair. A surface for supporting an input device and a surface for supporting a visual display device are attached to the carriage. As the seated operator rocks about the horizontal axis of the pivot shaft, the spatial distance between the surfaces for supporting an input device and the seated operator remain essentially constant, as does the spatial distance between the surface for supporting the visual display device and the seated operator.

Because the entire structure pivots in unison about a central axis, the operator can change the angle of inclination of the entire system while maintaining an initially established optimal spacial relationship to the equipment. By altering this angle of inclination periodically, the operator can change his weight distribution along the support surface of the seat thereby altering tissue, skeletal and muscular loads while maintaining the optimal working spatial relationship to the equipment. Altering these physical loads and pressures over time helps greatly in reducing fatigue.

DETAILED DESCRIPTION OF THE DRAWINGS

Figure 1:
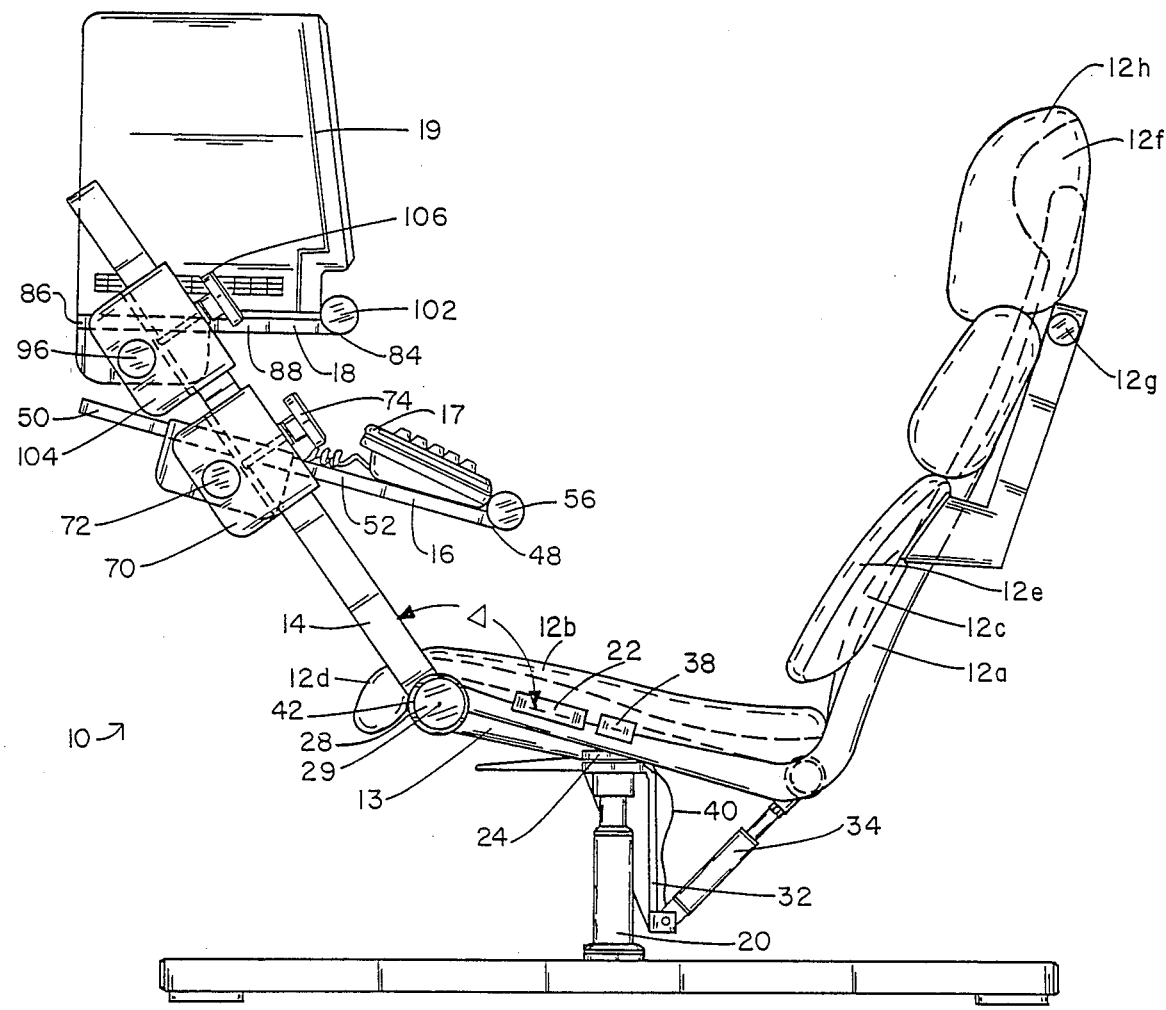
FIG. 1 is a side view of an ergonometric work station the embodiment of the invention.

An ergonometric work station 10 comprises a chair 12 for supporting a human operator in a seated position, a frame pivot substructure 13 (FIG. 4), a carriage 14, a first support means 16 for supporting a manually operated input device 17; and, a second support means 18 for supporting a visual display device 19. The work station 10 is manufactured from suitable materials, such as, for example, wood, plastic, metal or any combination thereof.

Chair 12 has a shape generally defined by a seat frame 12a. The chair 12 has a first portion 12b (contactable by the thigh portion of a seated operator) and a second portion 12c (contactable by the back of an operator). In a preferred embodiment, the seat frame 12a comprises two pieces of high-strength tubing attached to the underside of the first and second portions 12b, 12c and spaced apart by a distance approximately equal to the width of the first and second portion 12b, 12c. A front edge 12d of the first portion 12b of the seat is proximate the back of a seated operator's knee.

Arm supports 12e and head rest 12f are placed proximate the chair's second portion 12c. The arm supports 12e are coupled to each other through a structure affixed to the second portion 12c. The structure pivots about an axis located approximately half-way between the shoulder to seat surface distance for a 97.5 percentile male and a 2.5 percentile female (based on "Humanscale" by Niels Diffrient, published by MIT Press) as indicated at 12g in FIG. 1. The structure allows the operator's arms to rest in a range of comfortable positions and to enable the arm supports 12e to follow the natural range of motion of the arms.

Figure 12:
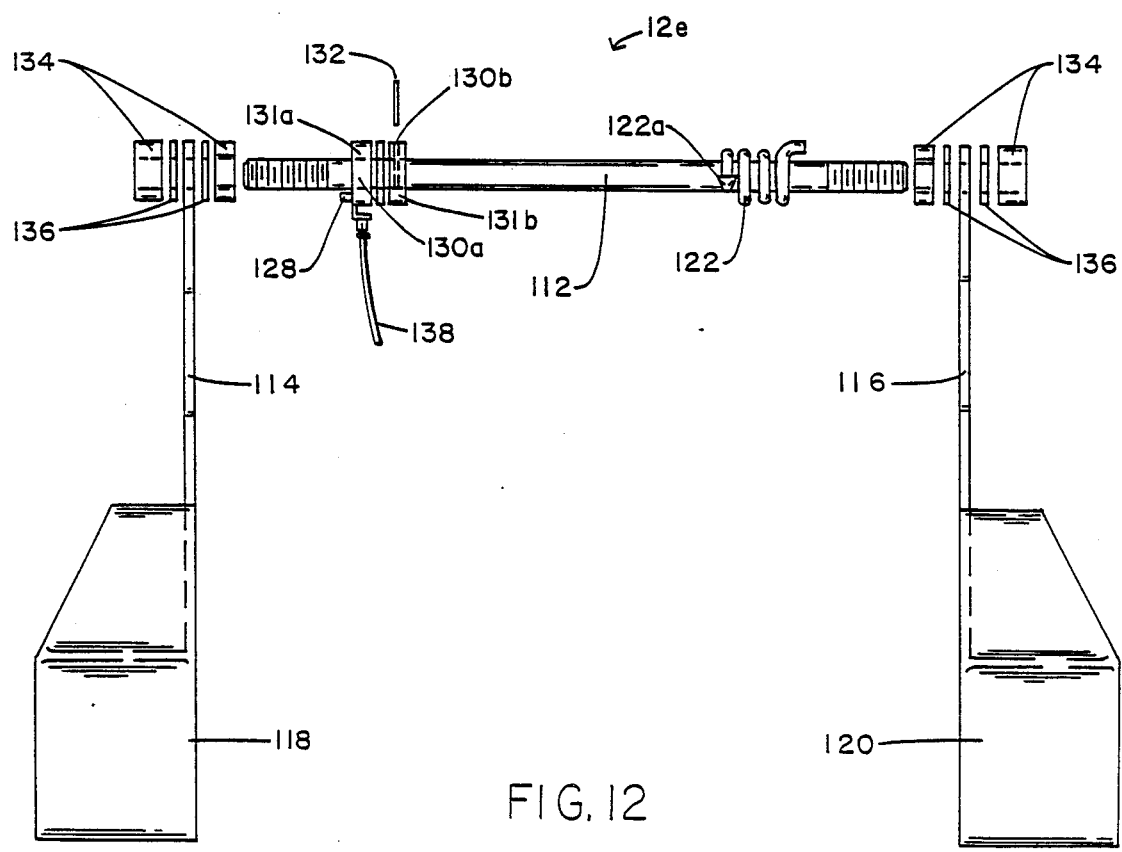
FIG. 12 is an exploded front view of an arm support means the embodiment of FIG. 1.
Figure 13:
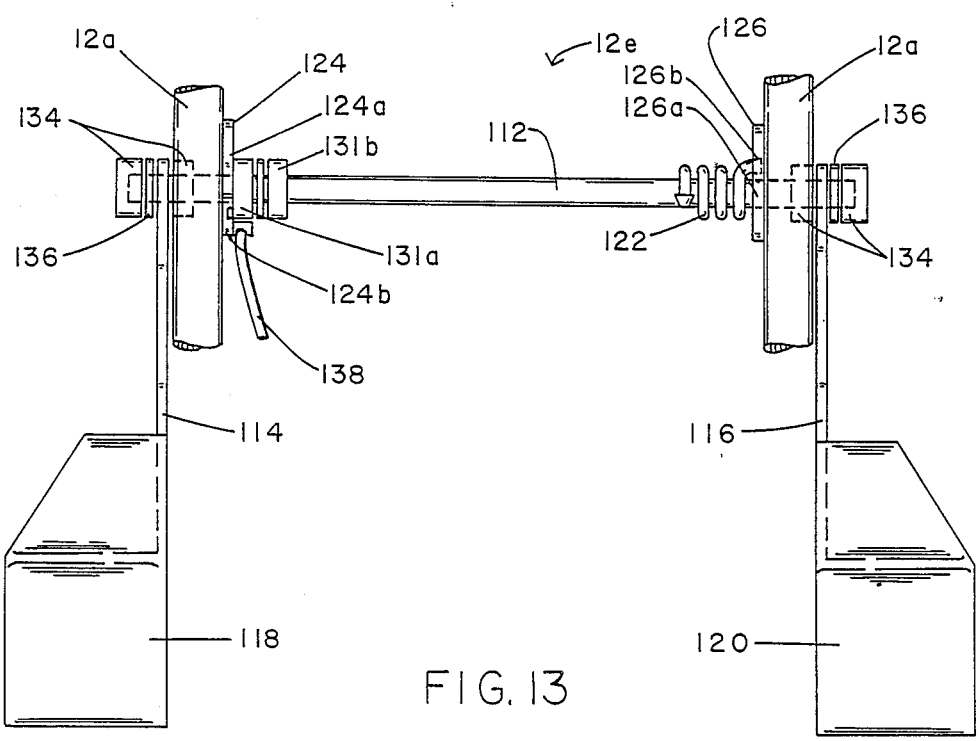
FIG. 13 is a front view of the arm support means used in the of FIG. 1.
Figure 14:
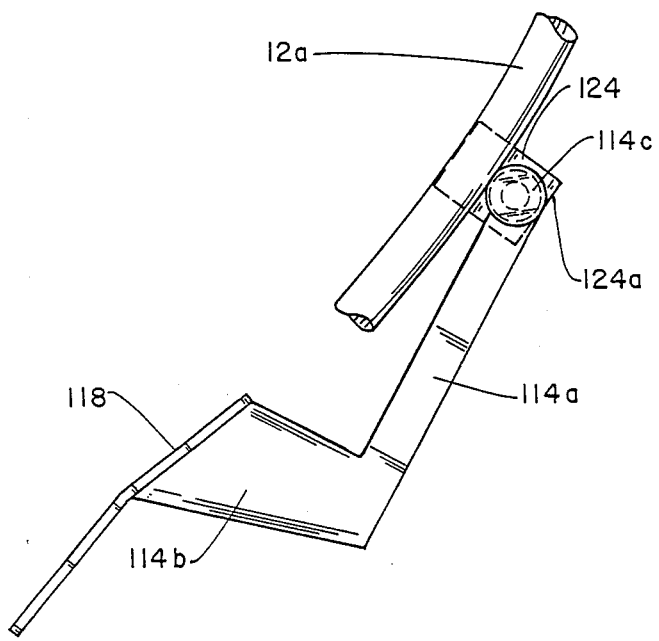
FIG. 14 is a side view of the arm support means shown in FIG. 13.

The arm supports 12e (FIGS. 12 and 13) comprise a connecting shaft 112, a pair of arm support brackets 114, 116, and a pair of arm support surfaces 118, 120. The length of the connecting shaft 112 is chosen to be greater than the width of the chair frame 12a. Each end of the connecting shaft 112 is threaded. Proximate a first end 112a (FIG. 12) of the connecting shaft 112 is a support spring 122, an inner end 122a of which is welded to the connecting shaft 112. As shown in FIG. 14 the arm support brackets 114, 116 are fabricated from a first portion 114a, 116a and a second portion 114b, 116b, the two portions being formed so as to be substantially perpendicular to each other. The free end of first portions 114a, 116a have holes 114c, 116c, respectively, formed therein to allow the arm support brackets 114, 116 to slide over the connecting shaft 112. The arm support surfaces 118, 120 are attached to the second portions 114b, 116b.

A pair of connecting shaft brackets 124, 126 are welded to the inside surface of the second portion 12c of the seat frame 12a. The brackets 124, 126 have first apertures 124a, 126a, respectively, of sufficient diameter to allow the connecting shaft 112 to pass therethrough. As shown in FIG. 13, shaft bracket 124 has a second aperture 124b proximate one end thereof to receive a lock pin 128 associated with a clutch mechanism 130. Shaft bracket 126 has a second aperture 126b proximate one end of the support bracket 126 to receive the free end of the support spring 122.

The clutch mechanism 130 comprises a fixed portion 131a having the lock pin 128 and a free portion 131b. A first opening 130a through the fixed and free portions allows the clutch mechanism 130 to fit over the connecting shaft 112. A second opening 130b, made in the free portion 131b perpendicular to the first opening 130a, is adapted to receive a coupling pin 132.

The clutch 130 is slid over the connecting shaft 112 which is then inserted into the left connecting shaft bracket 114 and backed into the right connecting shaft bracket 116 so that the free end of the support spring 122 is inserted into the second aperture 126b. The clutch 130 is moved to the left so that the lock pin 128 slides into the second aperture 124b. The coupling pin 132 is inserted through the second opening 130b and a hole (not shown) aligned with the second opening 130b to mate the two elements together. Finally, the arm support brackets 114, 116 are affixed to the connecting shaft ends using nuts 134 and lock washers 136.

A pair of vision cushions 12h project forwardly from each side of the head rest 12f. The vision cushions 12h function to block an operator's peripheral view, thus increasing forward concentration. In addition, the cushions 12h block extraneous noises.

The chair 12 is positioned a selectable distance above the floor by lift adjustment cylinders 20 which are operatable by a first control lever 22 to raise or lower the chair 12. Top portion 20a of the lift adjustment cylinders 20 are connected to the frame pivot substructure 13.

Figure 4:
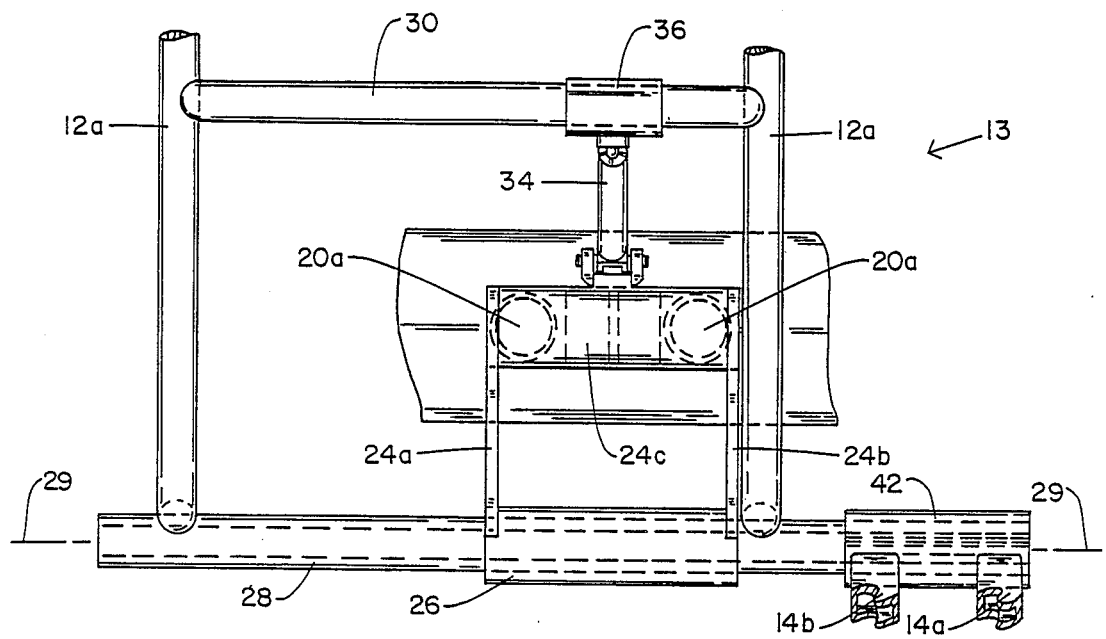
FIG. 4 is a top view of a frame pivot substructure use the embodiment shown in FIG. 1.

As seen in FIG. 4, frame pivot substructure 13 comprises a U-shaped support bracket 24. The underside of intermediate member 24c of bracket 24 is attached to the top portion 20a of the air cylinders 20. Two parallel members 24a, 24b of the support bracket 24 are attached to a main bushing sleeve 26 which is slid over a cylindrical main pivot shaft 28. The portion of the seat frame 12a that is proximate the front edge 12d of the seat is attached to the pivot shaft 28 by any suitable means, such as by welding. A recline cylinder shaft 30 is attached to the two seat frame tubings 12a a predetermined distance from the main pivot shaft 28. The recline cylinder shaft 30 is welded to the seat frame 12a and is parallel to the main pivot shaft 28.

A lower depending bracket 32 is attached to the support bracket 24 proximate the air cylinders 20. One end of a recline adjustment cylinder 34 is secured to the lower depending bracket 32 using a screw and nut. As shown in FIG. 4 the other end of the cylinder 34 is attached to a recline bushing sleeve 36 which slides over the recline cylinder shaft 30. A second control lever 38, attached to the recline adjustment cylinder 34 by a cable 40, allows the main pivot shaft 28 (and consequently the chair 12) to rotate about the main bushing sleeve 26 and thus about horizontal axis 29.

Figure 2:
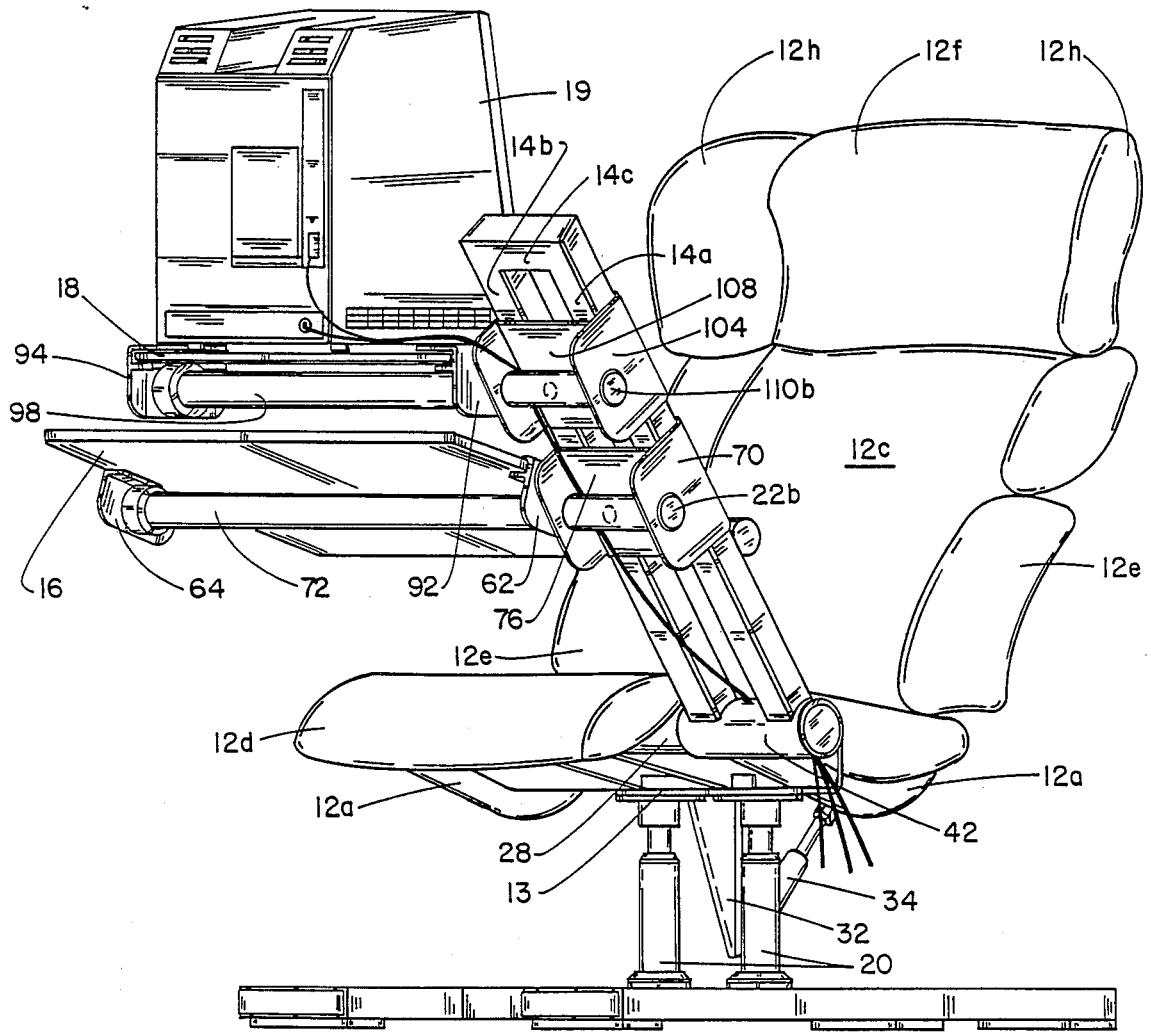
FIG. 2 is a front projected view of the work station of FIG. 1.
Figure 3:
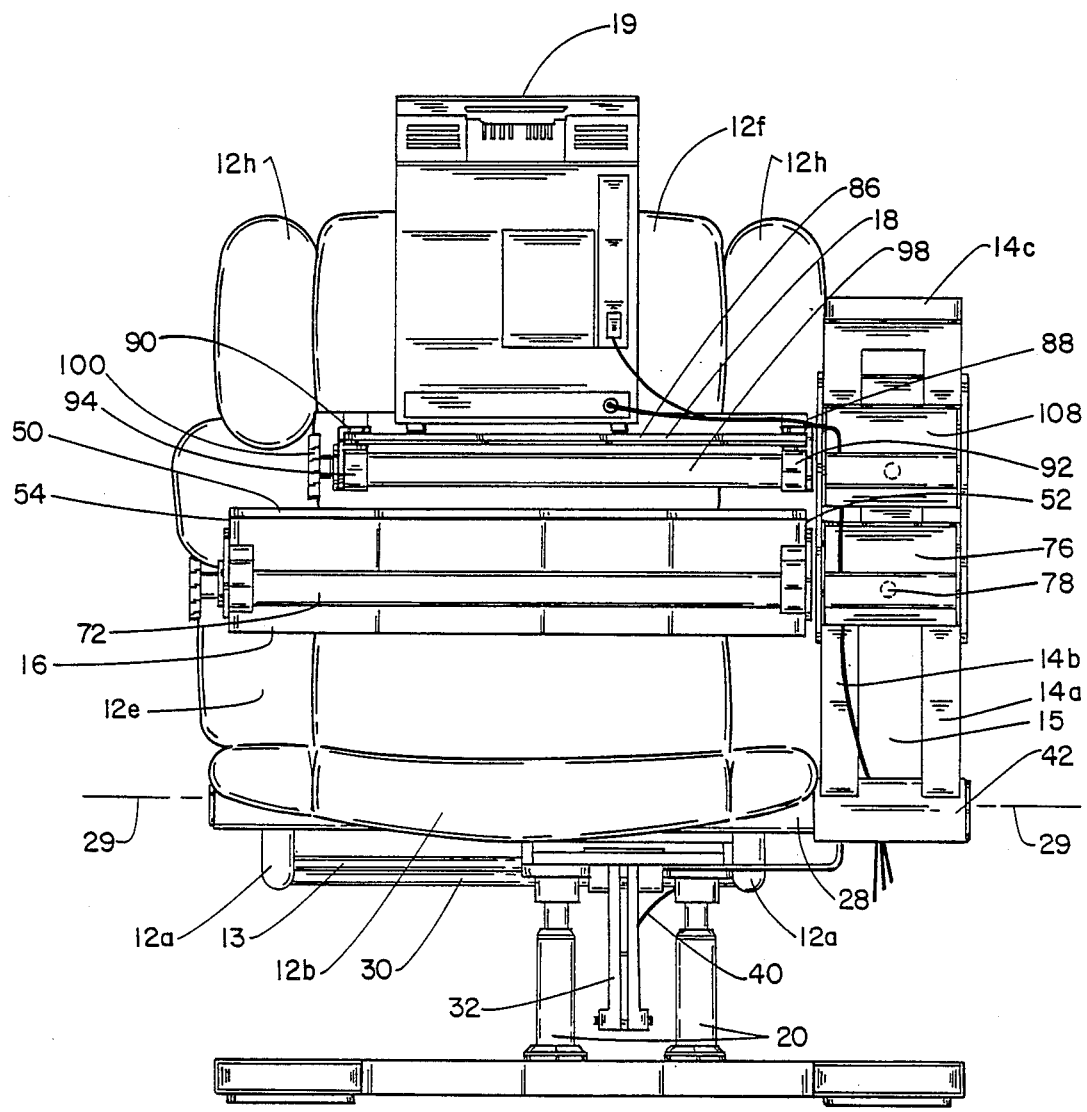
FIG. 3 is a front view of the work station of FIG. 1.

Carriage 14 is attached to the chair 12 proximate the front edge 12d of the first portion 12b. In a first embodiment depicted inter alia in FIGS. 1 and 2, carriage 14 comprises two parallel, elongated frame members 14a and 14b which are spaced apart from each other a predetermined distance. Bottom ends of the carriage members 14a,14b are connected to an essentially cylindrical carriage attaching means such as carriage attachment cylinder 42. The top ends of carriage members 14a,14b are connected together by member 14c. A channel 15 is formed between the carriage members 14a,14b. Alternatively, the carriage can be a single member having a channel formed therein.

Figure 5:
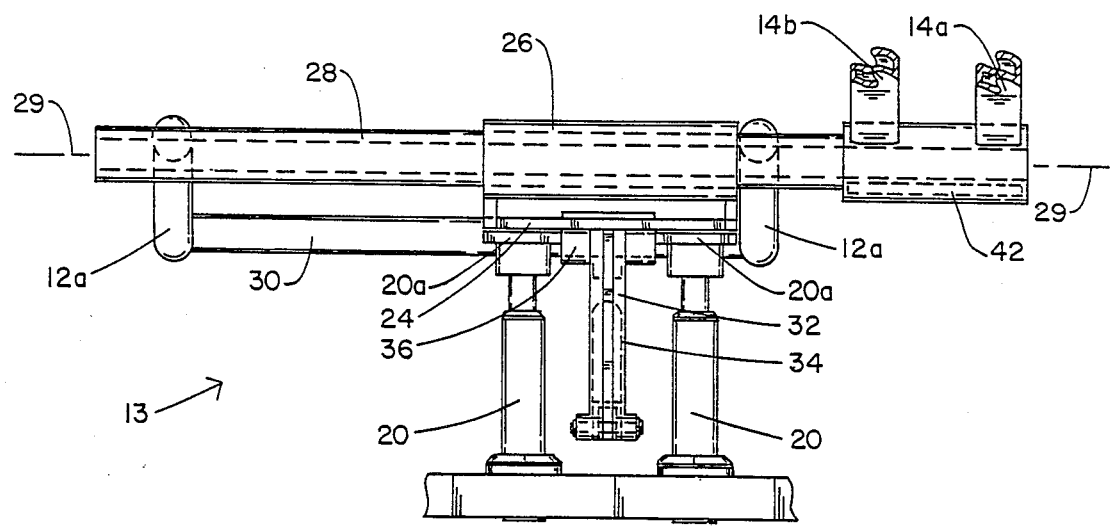
FIG. 5 is a front view of the frame pivot substructure FIG. 4.
Figure 6:
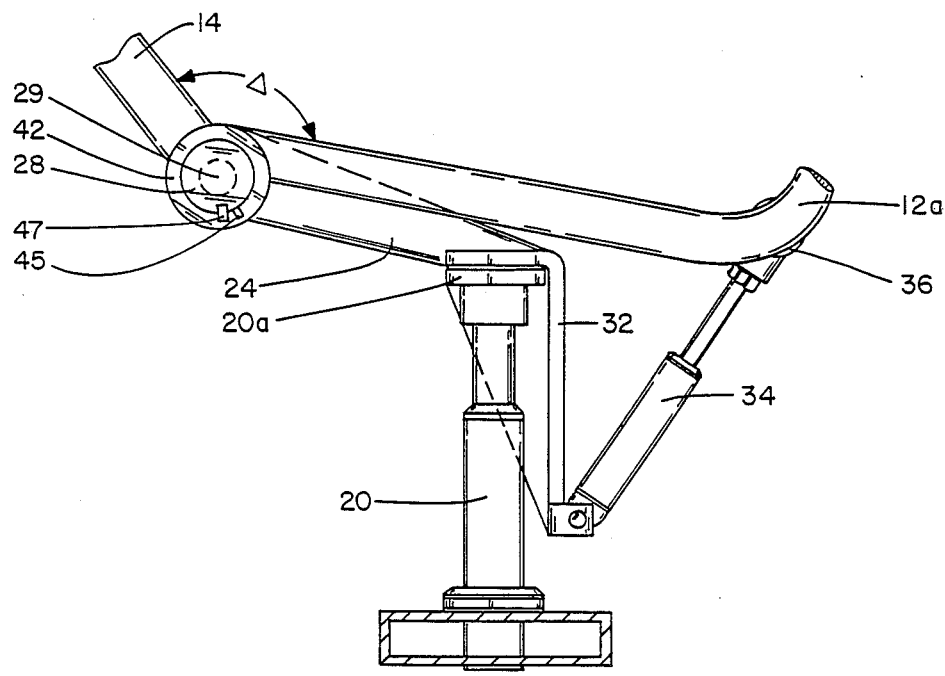
FIG. 6 is side view of the frame pivot substructure of FIG. 4, and showing a portion of a chair frame in a level position.
Figure 7:
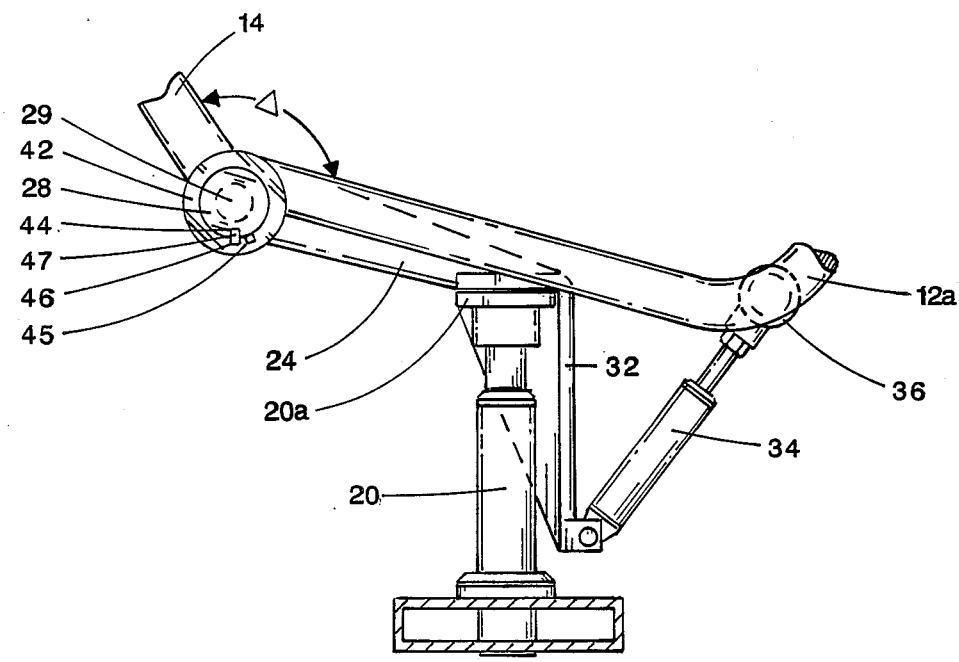
FIG. 7 is a side view of the frame pivot substructure of FIG. 4, and showing a portion of a chair frame in a lowered angled position.

As shown in FIGS. 4 and 5, the carriage 14 is attached to the chair 12 by the carriage attaching cylinder 42. In this respect, the carriage attachment cylinder 42 is placed over the end of the main pivot shaft 28 and, as shown in FIGS. 6 and 7, is positioned by a first slot 44 which can be aligned with a second slot 45 or a third slot 46 and locked in place with a key 47 and is manipulated to change angle delta of the carriage 14.

First device support means 16 is attached to the carriage 14. In the illustrated embodiment, supporting means 16 is a flat surface having a front edge 48, a rear edge 50, and two sides 52 and 54. The top surface of the front edge 48 has a wrist support 56 provided thereon to prevent items from falling off and also to provide a supporting surface for the operator's wrists. A pair of wrist support adjustment knobs 58 are positioned inside the front edge 48 of the first supporting means 16 (as indicated at 60 in FIG. 10) to raise and lower the wrist support 56 in relation to the first support means 16. Attached to the two sides 52 and 54 proximate a selected point between the front and rear edges 48,50 are a first pair of support brackets 62 and 64. A part of the brackets 62,64 which is perpendicular to the first flat surface 16 has an opening (unnumbered) therein to receive a first support level adjusting means 66 (to be discussed below), such as a support shaft 72, and a threaded rod having a tilt adjustment knob 67 attached to its head portion. A spacer, such as a washer 62a is positioned against the outer surface of the support bracket 62 while a second spacer, such as a washer 64a is positioned against the outer surface of the support bracket 64.

Figure 8:
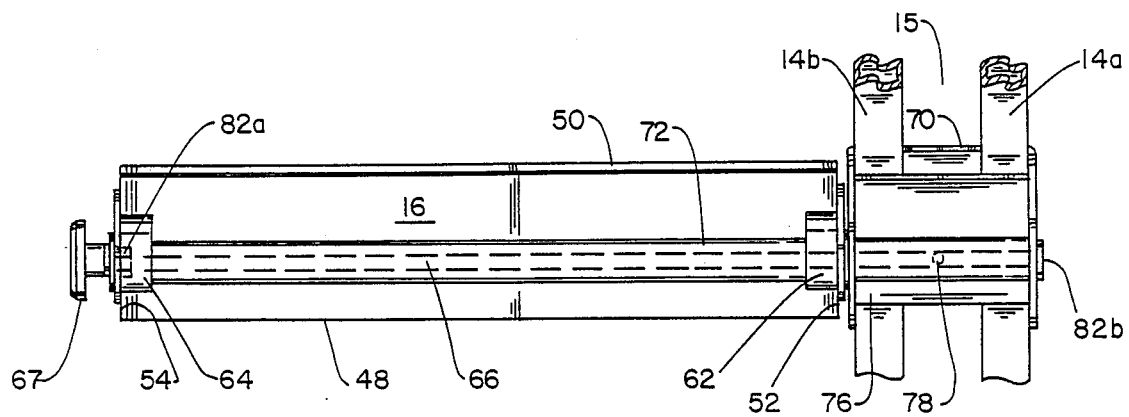
FIG. 8 is a partial front view of a supporting means used in the embodiment of FIG. 1.
Figure 9:
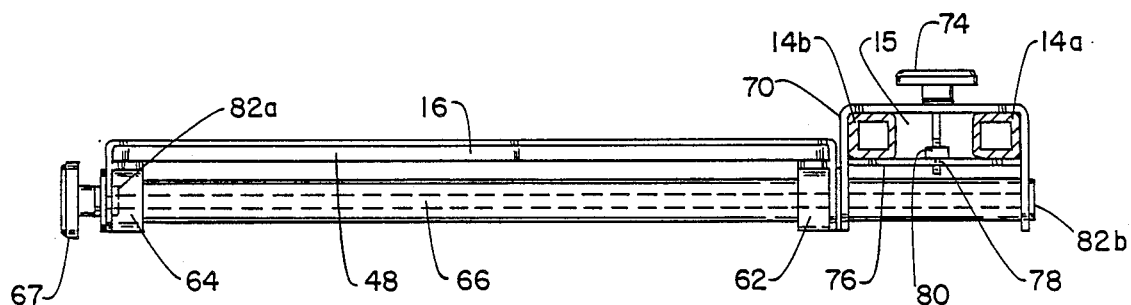
FIG. 9 is a partial front view, partially sectioned, of a supporting means used in the embodiment of FIG. 1.
Figure 10:
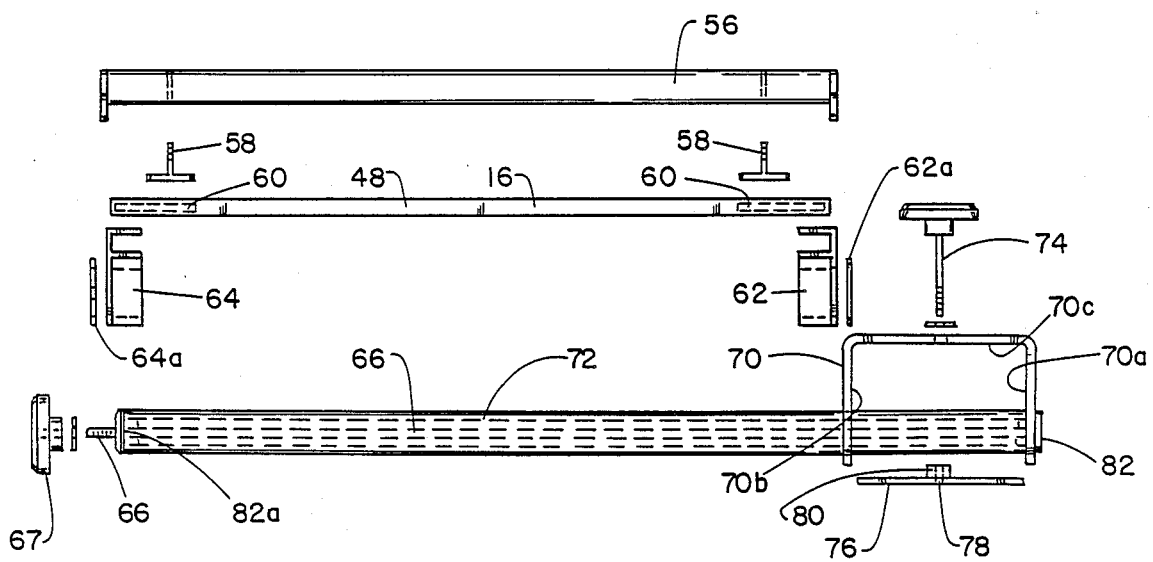
FIG. 10 is an exploded front view of the supporting means the embodiment of FIG. 1.
Figure 11:
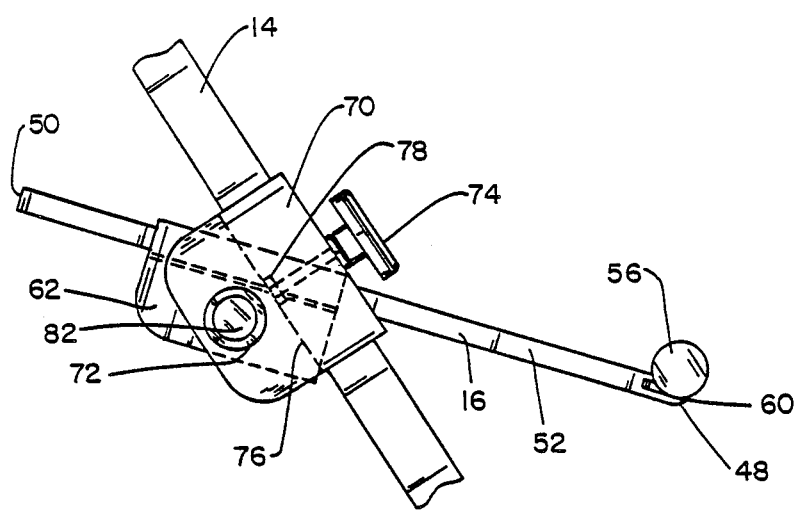
FIG. 11 is a side view of a support height adjusting means in the embodiment of FIG. 1.

Associated with the first device supporting means 16 is a first support height adjusting means such as a U-shaped carriage housing bracket 70 having two parallel surfaces positioned a predetermined distance apart from each other by a third surface which is perpendicular and intermediate the other two surfaces. The carriage housing bracket 70 has holes 70a, 70b, 70c created in the respective three surfaces proximate the center point of each surface. The holes 70a and 70b in the two parallel surfaces are large enough to accept the support shaft 72. The support shaft 72 is secured to the carriage housing bracket 70 by suitable means, such as by welding. The carriage 14 is placed through the bracket 70 and secured with the aid of first support height locking means, such as a carriage adjustment knob 74. Knob 74 passes through the top hole 70c in the bracket 70 and channel 15, as shown in FIGS. 8 to 10, and engages, on the underside of the carriage 14, an associated first plate 76 (FIG. 10) having a hole 78 and nut 80 to accept the carriage adjustment knob 74. Tightening the carriage adjustment knob 74 secures the carriage housing bracket 70 to the carriage 14.

First device supporting means 16 is secured to the carriage housing bracket 70 (and thus the carriage 14) through the first support level adjusting means 66. In the illustrated embodiments, the first support level adjusting means 66 has a tilt adjustment knob 67 that is screwed onto the end of the support shaft 72 that passes through an end cap 82a. The support surface 16 is tilted in relation to the support shaft 72 by adjusting the tilt adjustment knob 67. When the tilt adjustment knob 67 is loosened, the first support surface 16 is no longer in compression and the first support surface 16, along with the first support brackets 62,64 are free to rotate about the support shaft 72. Tightening the tilt adjustment knob 67 compresses the support brackets 62,64, against the support surface 16, locking the assembly between the tilt adjustment knob 67 and the carriage housing bracket 70.

Second device supporting means 18, also attached to the carriage 14, is in the illustrated embodiments a second flat surface having a front edge 84, a rear edge 86 and two sides 88 and 90. A second pair of support brackets 92 and 94 are attached to the two sides 88,90 at a selected point between the front and rear edges 84 and 86. These brackets also include an opening (unnumbered) therein to receive a second support level adjusting means 96, such as a threaded rod and support shaft 98. The threaded rod 96 has a tilt adjustment knob 100. The top of surface 18 includes a support 102 along the front edge 84 to retain items placed on the flat surface 18.

Second device supporting means 18 is attached to the carriage 14 in the same manner as described for the input device supporting means 16. Adjustable display height means, such as a second carriage housing bracket 104, is welded to the support shaft 98. The carriage housing bracket 104 is slid over the carriage 14 and secured to the carriage with a second support height locking means 106 which engages an associated second carriage plate 108 on the opposite side of the carriage 14. The threaded rod 96 having the second tilt adjustment knob 100 is inserted through a second end cap 110a, the support shaft 98 and screwed into a second end cap 110b. The second device supporting means 18 is then slid over the carriage 14 and secured in the same manner as for the first device supporting means 16.

In use, a visual display device 19, such as a computer with a monitor, is placed on the second flat surface 18. An input device 17, such as a keyboard, is placed on the first flat surface 16. An operator is seated in the chair 12 and proceeds to adjust the work station according to the operator's preference. The height of the chair is set by operating the first control lever 22. The operation of the first control lever raises or lowers the main pivot shaft 28 by extending or retracting the lift adjustment cylinders 20. Next, the angle delta of the carriage 14 is adjusted to the operator's preference by using the key 47 to align slot 44 with either slot 45 or slot 46 on the shaft 28. This particular step is not necessarily performed with every system usage, but rather when vastly different sized individuals use the same system. Finally, the second control lever 38 is manipulated to operate the recline adjustment cylinder 34, which rotates the shaft 28 about the bushing sleeve 26, tilting the work station.

The arm supports 12e are adjusted in relation to the seat frame 12a by manipulating a control cable 138 attached to the clutch mechanism 130. The other end of the control cable 138 is attached to a control lever (unillustrated). Releasing the tension on the cable 138 unlocks the clutch mechanism, permitting the arm support surfaces 118, 120 to move forward (due to tension produced by the supporting spring 122) or be manually pushed back. Increasing the tension on the control cable 138 locks the clutch mechanism 130, locking the arm supports 12e in place.

After the initial adjustments are made, the desired heights of the first support means 16 (upon which the keyboard 17 is placed) and the second support means (upon which the monitor 19 is placed) are set. The first support height locking means 74 is loosened (so that the first support means 16 can be lowered or raised on the carriage 14). When the desired height is reached the locking means 74 is tightened. In a similar manner, the second support height locking means 106 is loosened so as to adjust the height of the second support means 18 on the carriage 14. Tightening the locking means 74 and 106 prevents further changes in the height of the support means.

Finally, the support means 16,18 are given a desired tilt. Tilt adjustment knob 67 is loosened to set the tilt of the first support means 16. Likewise, tilt adjustment knob 100 permits the tilt of the second support means 18 to be adjusted. When the desired tilt is set, the knobs 67 and 100 are tightened.

Once the above described adjustments are completed, the spatial distance between the keyboard and the operator and the spatial distance between the monitor and the operator will remain essentially constant as the operator rocks about the horizontal axis 29 of the main pivot shaft 28.

SECOND EMBODIMENT

Figure 18:
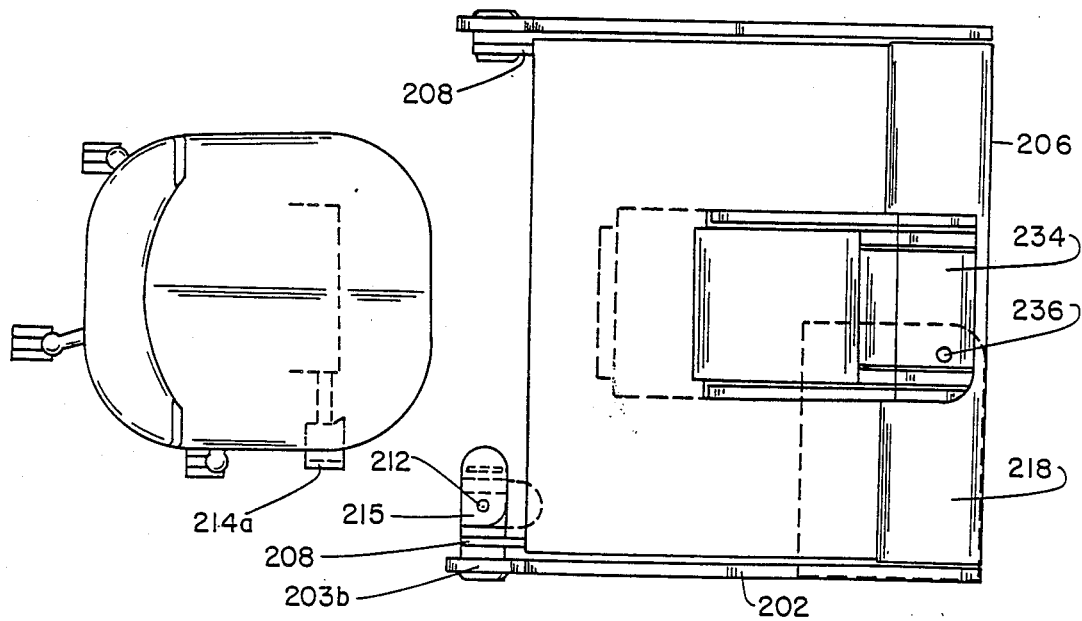
FIG. 18 is a top view of the embodiment of FIG. 15 showing a chair de-coupled from a workstation.

A second embodiment of the invention is shown with reference to FIGS. 15-26. In accordance with the second embodiment, an enclosure frame or desk 200 has two sides 202 and 204 and a back 206 (FIG. 18). A U-shaped carriage 208 (FIG. 16) is connected to flanges 203a, 203b proximate the front edges of the two frame sides 202 and 204 by a connecting shaft 210 and chair interface shaft 211. Connecting shaft 210 secures portion 208a. Chair interface shaft 211 secures portion 208b of the carriage 208 to flang 203b. The carriage 208 comprises two parallel portions 208a and 208b, spaced a predetermined distance apart by a third rear perpendicular portion 208c. The rear portion 208c of the carriage 208 is secured to a first device supporting means 216 (such as a first surface) by an adjustable slide mechanism 213. The adjustable slide mechanism 213, which is placed proximate the two edges of the rear portion 208c that mate with portions 208a, 208b, allows the first surface 216 to slide back and forth on the rear portion 208c of the carriage 208. A second device supporting means 218, such as a second surface, is located a predetermined distance above the input device supporting means, being attached to the back 206 at top portion 206a.

Chair interface shaft 211 is adapted to mate with coupling shaft 214, by the aid of an interface 215. The interface 215 (FIG. 25) comprises an essentially rectangular block having a tapered edge with a first L-shaped notch 215a, a straight edge with a second notch 215b, and two parallel sides. An aperture 215c is placed in the two parallel sides proximate the straight edge and perpendicular to the second notch 215b.

The chair interface shaft 211 (FIG. 23-25) comprises a cylindrical shaft having a first end 211a with a threaded hole 211b, a second end 211c with an aperture 211d and a threaded outer body 211e. The first end 211a has a bushing 211f placed over its circumference, after which the assembly is passed through an opening in the flange 203b proximate the front of the desk 200 and secured by a screw 211g screwed into the threaded hole 211b. The second end 211c passes through an opening in portion 208b of the carriage 208 and is secured by an interface shaft nut 220 screwed over the outer body 211e. Portion 208b is thus positioned between lip 211h and the shaft nut 220. The second end 211c is then placed into the second notch 215b of interface 215 and secured by locking pin 212. Locking pin 212 passes through opening 215c in the interface 215 and aperture 211d of the shaft 211.

Means for moving the carriage 208, such as a piston or air cylinder 222, has one end connected to a first surface pivot shaft 208d of the carriage 208. The pivot shaft 208d (FIG. 16) comprises a cylindrical shaft that runs parallel to the carriage component 208c and is affixed to the carriage sides 208a, 208b. The carriage component 208c can be rotated about the pivot shaft 208d and is held in place in relation to the shaft by means of frictional fit between the shaft 208d and bushings of the carriage component 208c through which the shaft 208d passes. The other end of the piston 222 is attached to a U-shaped bracket 207 which is secured to bottom portion 206b of the back 206 of the desk 200 (see FIG. 15). The actuator 222 may be secured using screws and nuts. The end of the actuator 222 secured to the desk 200 is not movable. The air cylinder 222 includes a control valve 223 that is operated by a cable 226 placed at a convenient spot proximate the input device supporting means 216.

An operator supporting means, such as a chair 228, has a first portion 228a, a second portion 228b, legs 228c (which raise the chair a predetermined distance above the floor) and a horizontal rocking axis 232 which pivots about the coupling shaft 214. The chair 228 is coupled to the carriage 208 by moving the chair towards the desk 200 until the coupling shaft end 214a (which has an L-shaped end) (FIG. 23) becomes aligned with interface 215. The L-shaped end of the coupling shaft 214a is then inserted into the L-shaped notch 215a of the interface 215.

In use, the surface 216 of the work station can be adjusted over a wide range of angles and heights, as indicated by FIGS. 15-22. To achieve a setting desired by an operator. The interface 215 must be positioned in relation to the carriage 208b. This position is accomplished by loosening the interface shaft nut 220. The carriage 208 is then adjustable without rotating the interface 215. When the desired horizontal height of the first surface 216 is obtained, the interface shaft nut 220 is retightened on the interface shaft 211 so as to lock the carriage side 208b to the interface assembly. Control valve 223 is then operated to control the piston 222.

Figure 15:
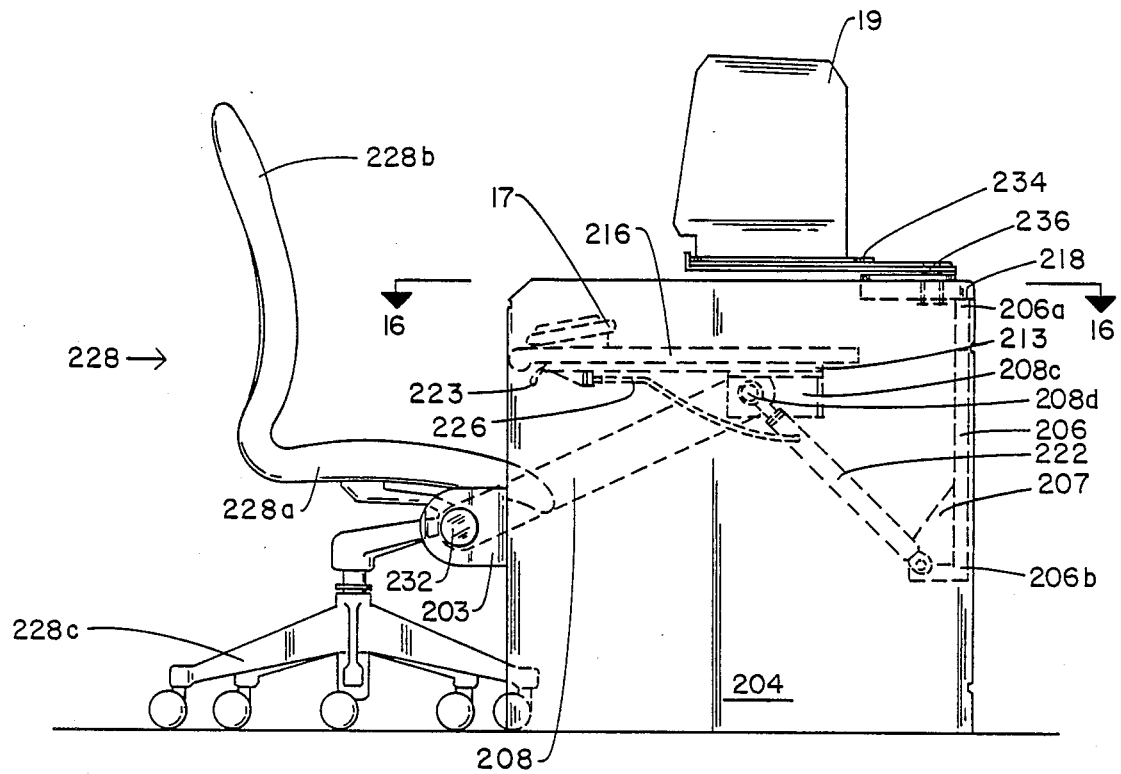
FIG. 15 is a side view of an ergonometric work station according to a second embodiment of the invention.
Figure 16:
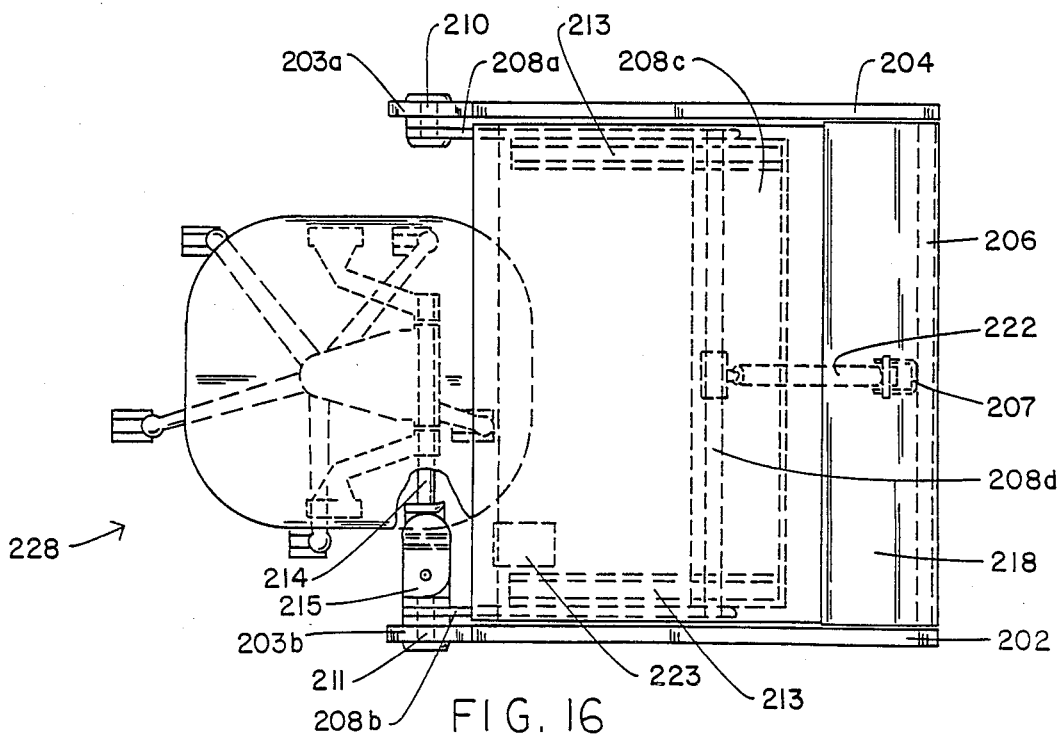
FIG. 16 is a top view taken along lines 16—16 of FIG. 15, also showing a chair coupled to the work station.
Figure 17:
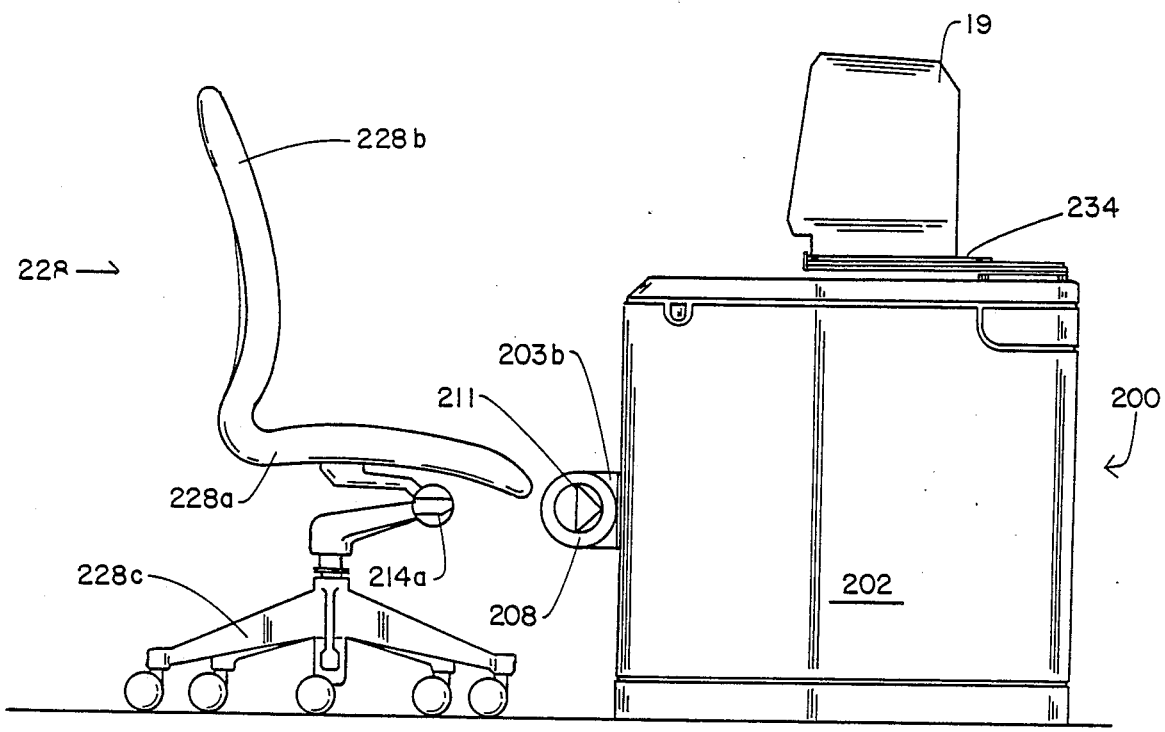
FIG. 17 is a side view of an ergonometric work station according to the embodiment of FIG. 15, showing a chair de-coupled the work station.
Figure 19:
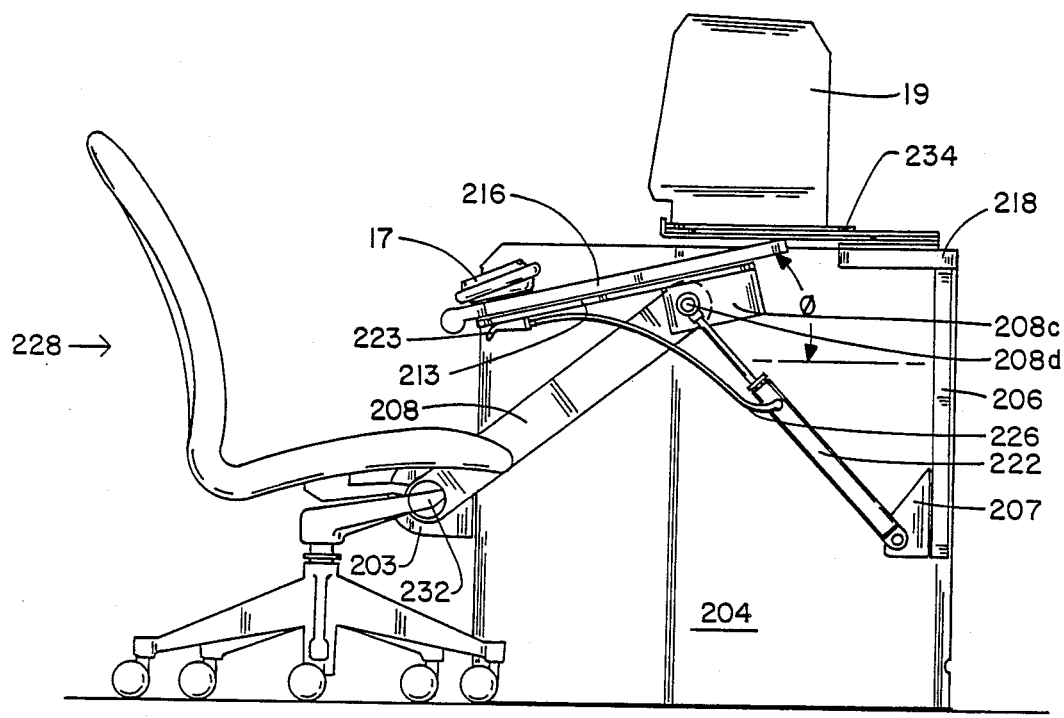
FIG. 19 is a side view of the embodiment of FIG. 15 with the sidewall removed, and further showing a support means in an inclined position.
Figure 20:
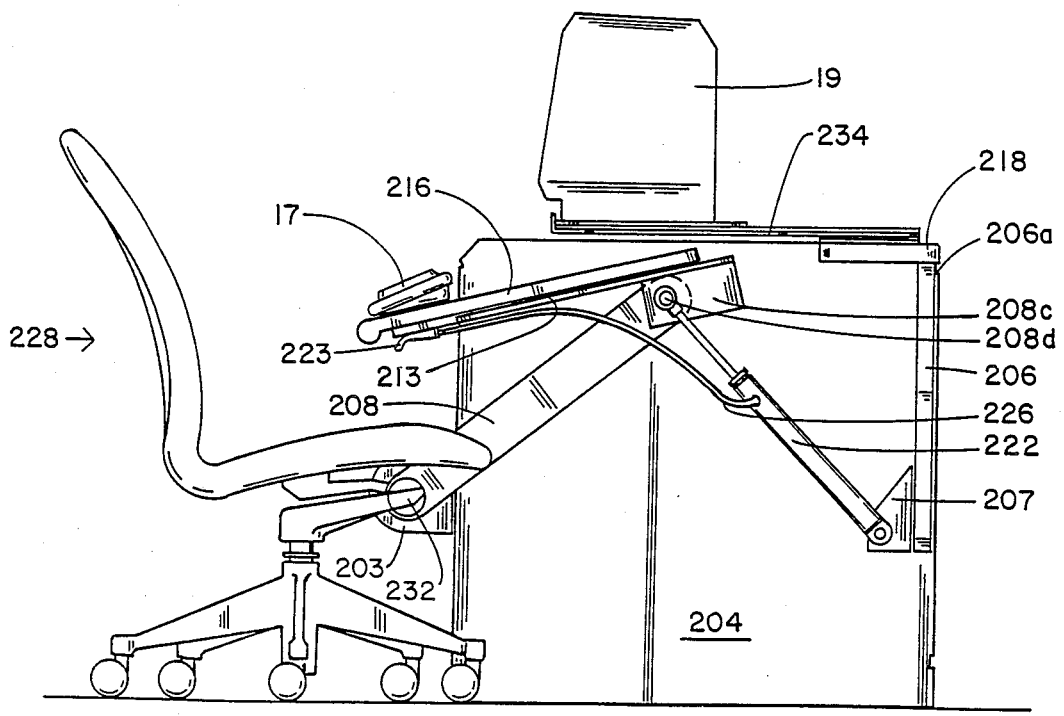
FIG. 20 a side view of the embodiment of FIG. 15 in which the support means is extended towards a chair.
Figure 21:
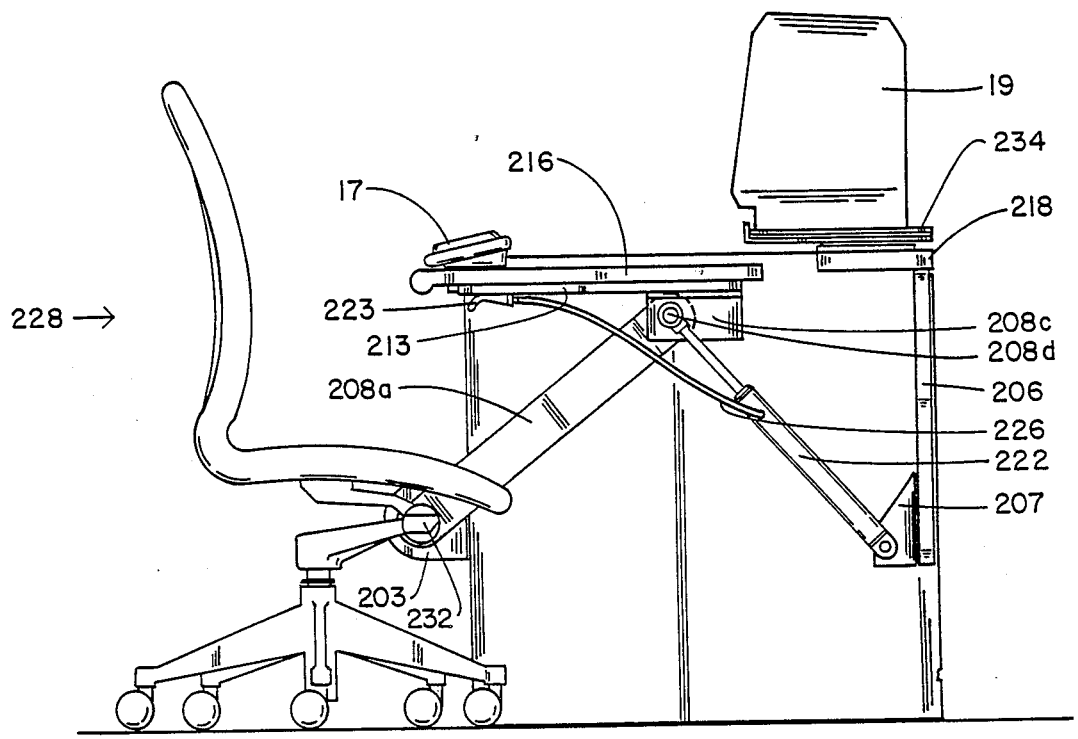
FIG. 21 is a side view of the invention according to the embodiment of FIG. 15 showing the support means in a raised, level position.
Figure 22:
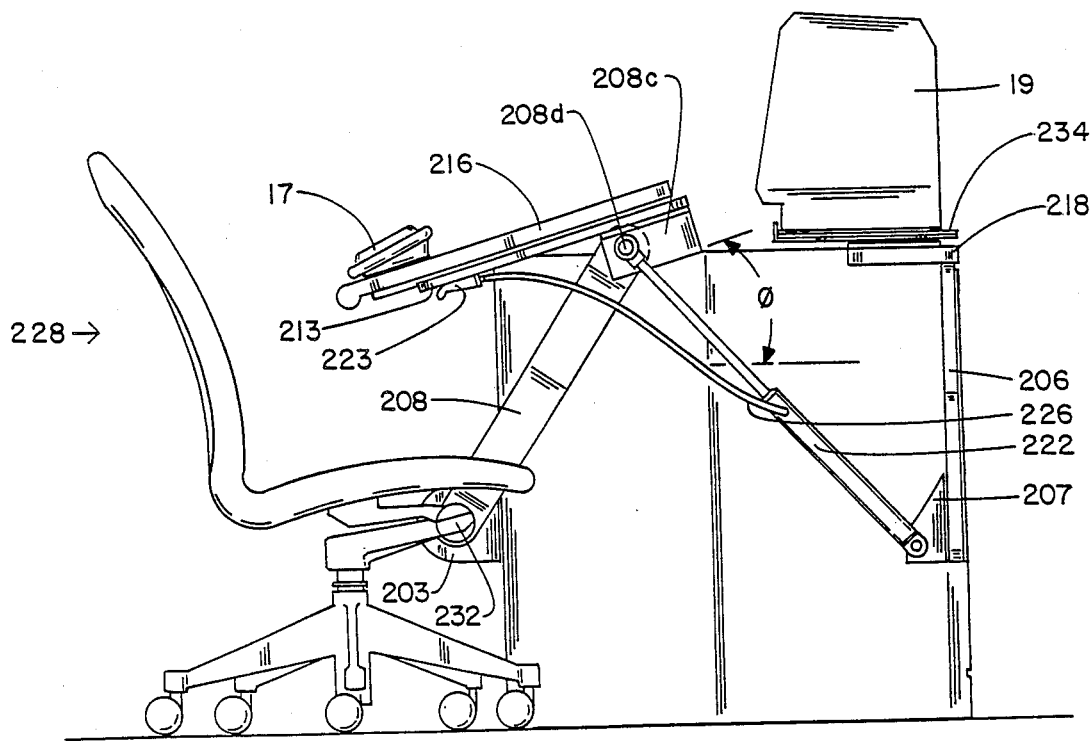
FIG. 22 is a side view of the embodiment of FIG. 21 wherein means is tilted.
Figure 23:
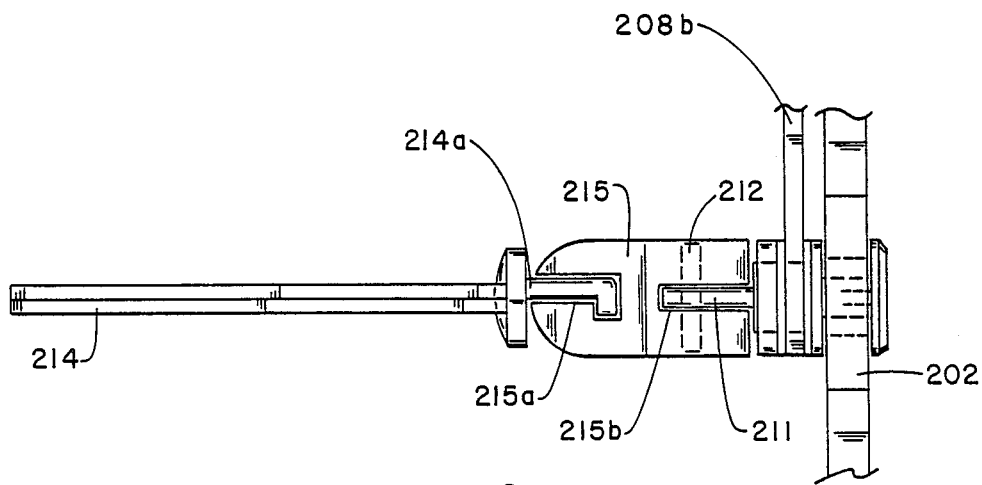
FIG. 23 is a front view of an interface used with an embodiment the invention.
Figure 24:
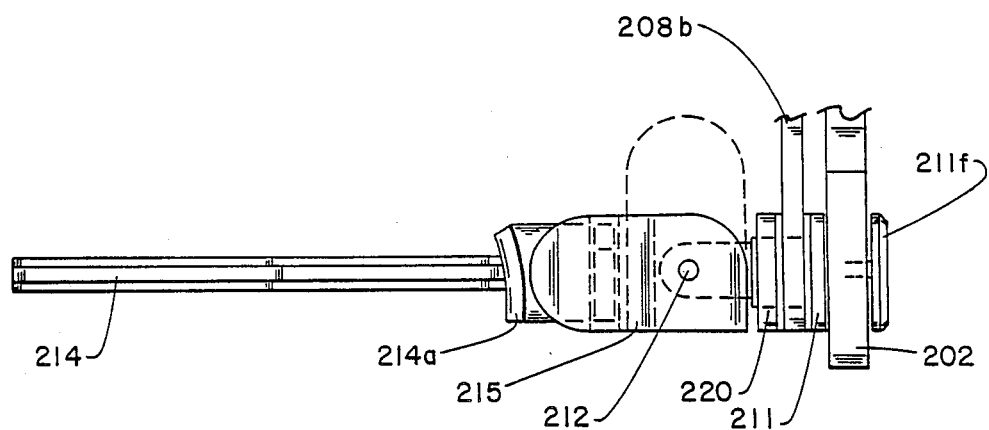
FIG. 24 is a plan view of the interface shown in FIG. 23.
Figure 25:
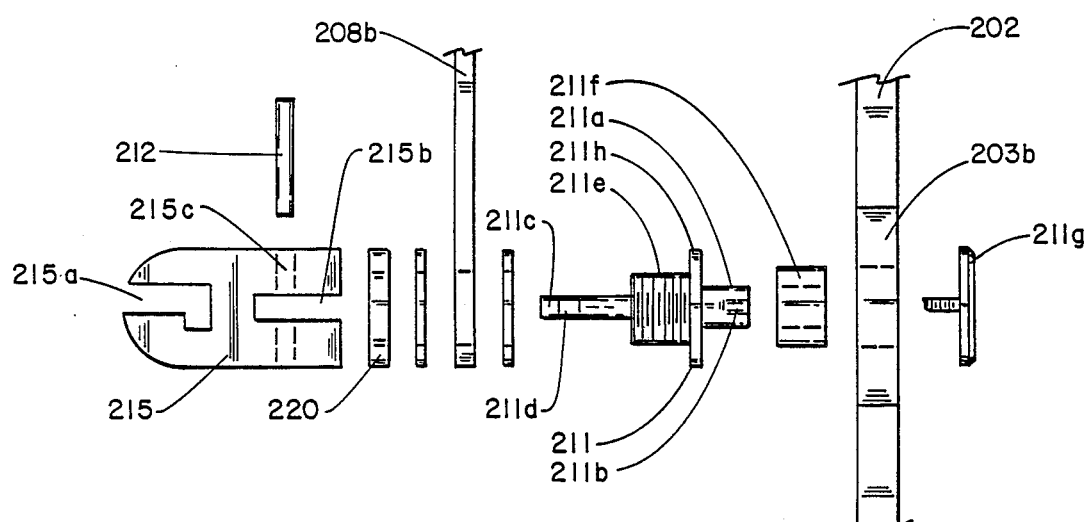
FIG. 25 is an exploded front view of the interface used in embodiment of the invention; and, FIG. 26 is a partial side view of a carriage used in the embodiment of FIG. 15.
Figure 26:
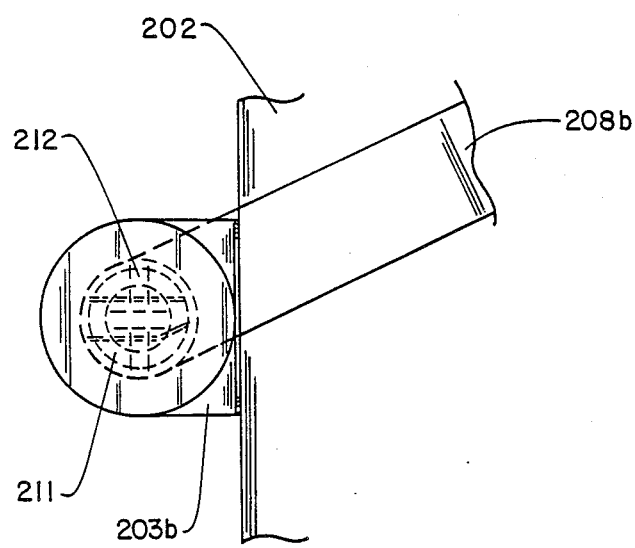

With respect to the operation of control valve 223, in FIG. 15 the surface 216 is in a level position while FIG. 19 shows the surface 216 tilted at an angle $\phi$ to the horizontal. Upon opening the piston's control valve 223, the U-shaped carriage 208 can be tilted relative to the floor to obtain the desired angular positioning of the surface 216. As the chair 228 is coupled to the carriage 208 by the coupling shaft 214, the chair 228 will also rock about its horizontal axis 232 in response to the movement of the carriage 208. As the adjustments are being made, the spatial distances between the surface 216 and the seated operator remain essentially constant. When the desired angle is obtained, the control valve 223 is closed to lock the setting. Once the control valve 223 is locked, the first surface pivot shaft 208d will not be able to move. Additionally, the chair 228 will no longer rock about its horizontal rocking axis 232.

A manually adjustable visual display stand 234 (FIG. 15) is placed on the second flat surface 218 and rotates about a pivot pin 236. A visual display device 19 rests on the stand 234. The display stand 234 telescopes to allow manual adjustment of the position of the display device 19. With this arrangement, it is necessary to separately adjust the position of the first device supporting means 216 and the manually adjustable visual stand 234. When the coupling action of the chair to the workstation is not desired, the interface 215 can be rotated about the locking pin 212 (as shown by the dotted lines in FIG. 24) so as to be out of the way.

THIRD EMBODIMENT

Figure 27:
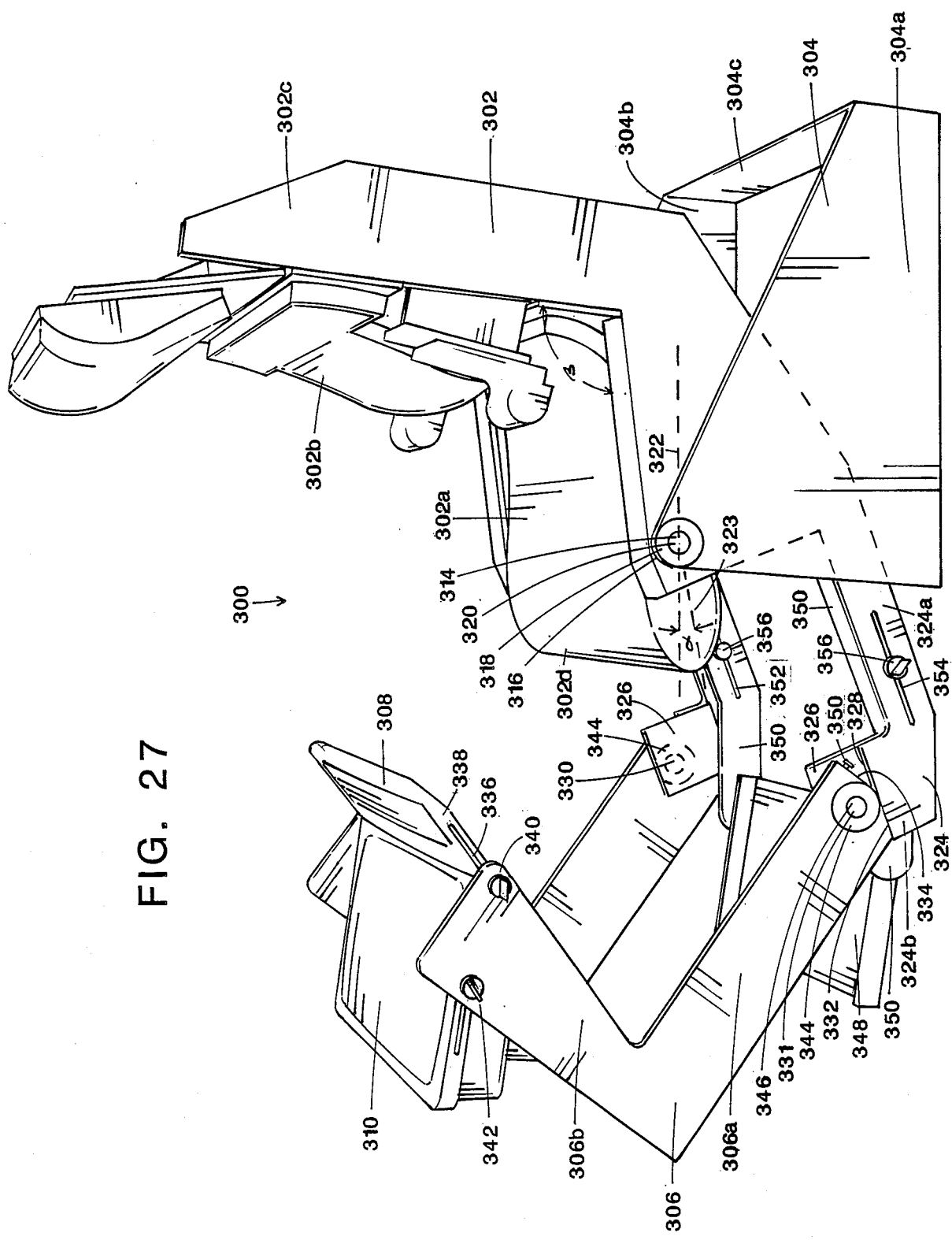
FIG. 27 is a side view of a third embodiment of an ergonometric station in an ingress position.
Figure 28:
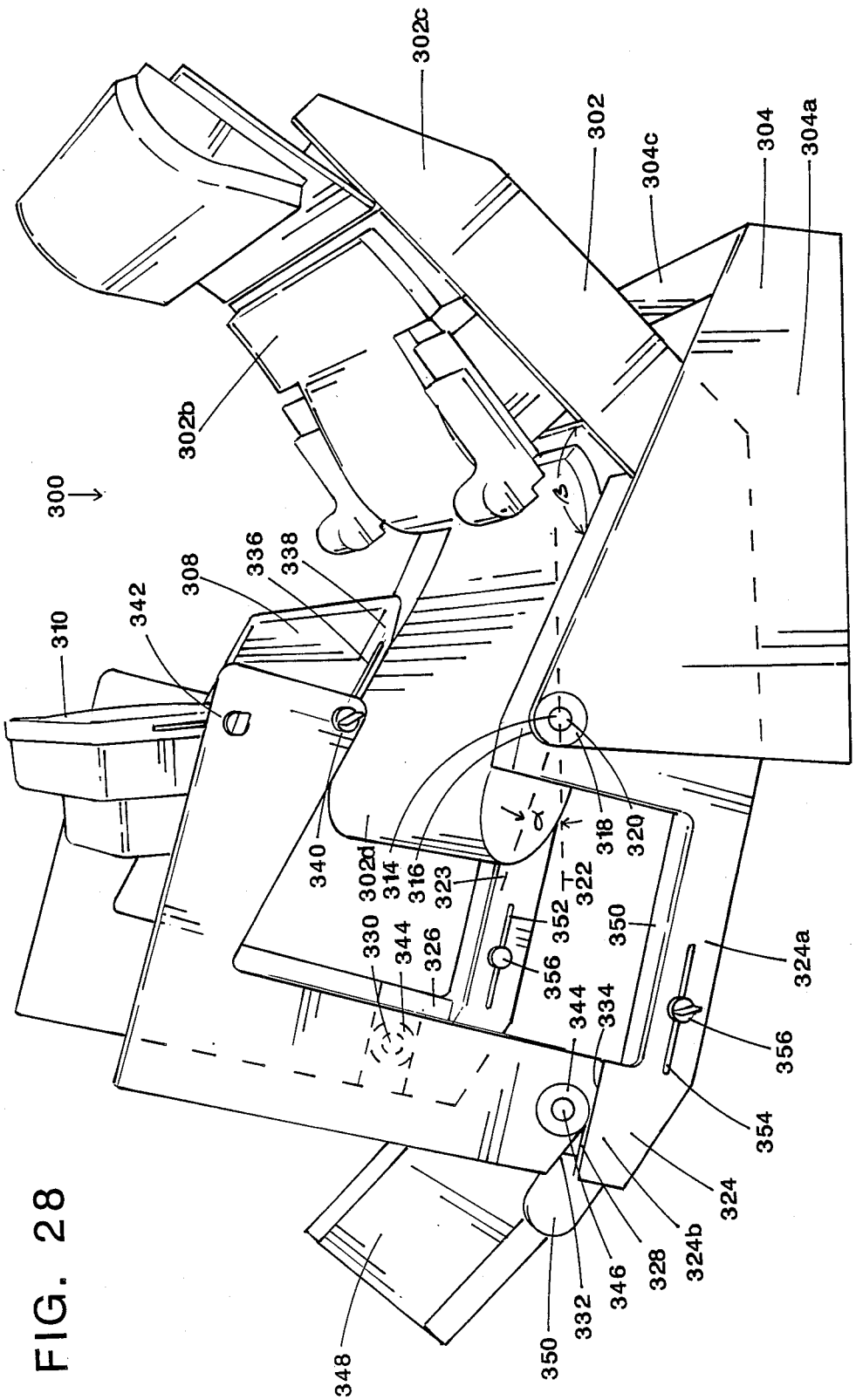
FIG. 28 is a side view of the embodiment of FIG. 27 in an operating position; and, FIG. 29 is a side view of a portion of a carriage attaching structure of FIG. 27, showing a portion of a carriage in an entry/exit position.
Figure 29:
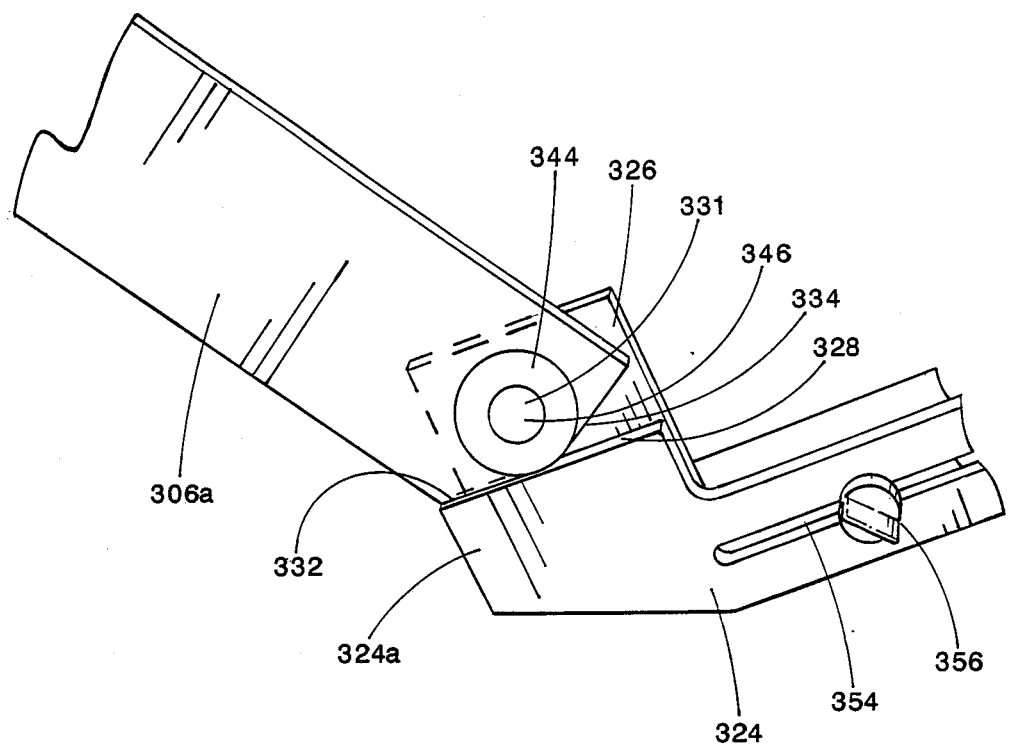

A third embodiment of the invention is shown with reference to FIGS. 27, 28, and 29. In accordance with the third embodiment, an ergonometric work station 300 comprises a chair 302 for supporting a human operator in a seated position; a support enclosure means 304 for supporting the chair 302; a carriage 306; a first support means 308 for supporting an input device; and, a second support means 310 for supporting a display device.

The structure of the chair 302 is similar to chair 12 described in the first embodiment, having a first portion 302a contactable by the thigh portion of a seated operator, a second portion 302b contactable by the back of the operator and two side frames 302c, which determine the shape of the chair 302. The side frames 302c are designed such that angle Beta (located between the thigh portion 302a and the back portion 302b of the chair 302) is between approximately 103° and 107°, but preferably 105°. It is understood that the remaining features of the chair 302, such as the supporting means and the arm rests, can be constructed as described in the first embodiment.

Support enclosure means 304 has two sides 304a, 304b and a back 306. An aperture 314 is created proximate a first edge 316 of each side 304a, 304b to receive an attaching means 318, such as a bolt, which serves to position the chair 302 a predetermined distance above the floor. The aperture 314 and associated bolt 318 define a first horizontal axis 320 about which the chair 302 rocks. When the chair is rocked about the first horizontal axis 320 to an entry/exit position, as shown in FIG. 27, front edge 302d of the chair 302 is positioned downward of horizontal line 322, as shown by depending line 323. Horizontal line 322 is parallel to the horizontal, and passes through axis 320. Line 323 represents a line in a plane that intersects the front edge 302d of the first portion 302a of the chair 302 near the midpoint of the front edge 302d. The intersection of horizontal line 322 and depending line 323 forms an angle Alpha which ranges from 0° to 20°, and which is preferably about 10°. When the chair is rocked about the first horizontal axis 320 to a maximum reclined position, as depicted in FIG. 28, the front edge 302d is raised to a point indicated by line 323. The intersection of horizontal line 322 and line 323 forms an angle Gamma, which ranges as great as 40°, but is preferably about 26°.

An L-shaped carriage attaching means 324, comprising a long section 324a and a short section 324b, extends from each side frame 302b of the chair 302. The carriage attaching means 324 is located forward of the first horizontal axis 320 at a point proximate the floor, so as to facilitate an easy entry and exiting of the operator from the chair. An extension 326 is secured to the inside surface of each short section 324b, resulting in the creation of a stop block 328. An aperture 330 is formed in each extension 326, the purpose of which will be discussed below.

The carriage 306 comprises two inverted L-shaped assemblies having a first portion 306a which interfaces with the carriage attaching means 324b and a second portion 306b, the first supporting means 308 and second supporting means 310 are attached to the second portion of 306b. The end of the first portion 306a that engages extension 326 is shaped so as to form a carriage position setting means having a first stopper edge 332 and a second stopper edge 334 (FIG. 29). An aperture 331 is formed in the first portion 306a of the carriage 306 proximate the first and second stopper edge 332, 334. The purpose of this aperture will be described below.

The second portion 306b of the carriage is attached to the first and second supporting means 308, 310 in any desired fashion. For example, embodiments have been constructed employing structures similar to the structure employed in the chair of the first embodiment. In the presently described embodiment, a channel 336 is formed in a sidewall 338 of the first supporting means 308. A first locking means, such as a screw and nut assembly 340, passes through an aperture (not shown) in the second portion 306B of the carriage and channel 336. The assembly 340 permits the operator to adjust the position of the supporting means 308 to his preference. Similarly, a second locking means 342 is provided to permit adjustment of the second supporting means 310.

The first portion 306a of the carriage 306 is aligned with the extension 326 so that the apertures 330 and 331 are in the same plane. A position setting means, such as a screw and nut assembly 344 is inserted through the two apertures 330 and 331 to secure the carriage 306 to the extension 326. The diameter of the screw 344 is selected to be slightly smaller than the apertures 330 and 331 so that the carriage 306 can freely pivot about a second horizontal axis 346 defined by the position setting means 344.

A footrest 348 is provided for the comfort of the seated operator. The footrest 348 is attached to a pair of slide rails 350 having a channel 352. A similar type channel 354 is provided in the long section 324a of the carriage attaching means 324. An adjusting and locking means, such as a bold and wingnut 356 is inserted through both channels 352, 354. Manipulation of the adjusting and locking means 356 facilitates adjustment of the footrest 348.

In use, the work station 300 will typically initially be in its entry/exit position, as shown in FIG. 27. In this position, the chair 302 is tilted forward approximately 20° as indicated by angle Alpha. The carriage 306 is pivoted (if necessary) about the second horizontal axis 346 until the first stopper edge 332 contacts the stop block 328 (FIG. 29). The operator seats himself in the chair 302 and pulls the carriage 306 towards him until the second stopper edge 334 contacts the stop block 328 (FIG. 28). Alternatively, the operator can rock the chair 302 backward about the first horizontal axis 320. This backward rocking action will cause the carriage to pivot from the entry position of FIG. 27 to the reclining position of FIG. 28. The carriage 306 is permitted to freely pivot about the second horizontal axis 346 so as to permit easy entering and exiting of the work station. However, the preferred shape of carriage 306 creates an offset load that results in the carriage 306 moving towards the chair 302 as the chair is rocked about the first horizontal axis 320. That is, the construction of the carriage 306 places the supporting means 308 and 310 (and thus its associated components, such as a keyboard and monitor) in such a location that when the seated operator rocks the chair about the first horizontal axis 320, the carriage will have a tendency to swing from its entry/exit position (whereby the first stopper edge 332 is proximate the stopper block 328) to its reclining position (whereby the second stopper edge 334 is proximate the stopper block 328). The carriage will stay in this reclined position, effectively locking the carriage 306 in the desired position, until it is physically moved by the operator back to the entry/exit position. Consequently, the spatial distance between the operator seated in the chair 302 and the supporting means 308, 310, remains essentially constant as the chair is rocked about the first horizontal axis 320. To exit from the work station 300, the operator rocks the chair 302 forward about the first horizontal axis 320 and then pushes the carriage 306 away from him, causing the carriage to pivot about the second horizontal axis 346, until the first stopper edge 332 once again is proximate the stop block 328.

Under certain circumstances, such as when a tall person uses the work station, it may be desirable to limit the degree of rockability of the carriage 306 about the second horizontal axis 346. This is easily accomplished by inserting a tilt adjusting means, such as a screw 350 (FIG. 27) into the desired depth of the second stop edge 334 of the carriage 306. Other methods of limiting the range of motion of the carriage 306 can be employed without departing from the scope of the invention.

While the invention has been particulary shown and described with reference to the preferred embodiments thereof, it will be understood by those skilled in the art that various alterations in form and detail may be made therein without departing from the spirit and scope of the invention. For example, the second flat surface can be mounted in a number of ways not shown. Surface could be attached to the first surface with an angled adjustable standing bracket. Alternatively, an adjustable arm having a first end attached to the first surface and a second end attached to the second surface can be used.

The embodiments of the invention in which an exclusive property or privilege is claimed are defined as follows:

1. A work station comprising:
   a chair for supporting a human operator in a seated position, said chair having means for supporting the thigh portion of a human and means for contacting a back portion of a human, said chair being rockable about a first horizontal axis;
   a carriage;
   a support surface upon which a first device is supportable, said device-supporting surface being attached to said carriage; and,
   carriage attaching means for attaching said carriage to said chair, said carriage attaching means including a position setting means for pivoting said carriage about a second horizontal axis whereby said carriage pivots toward or away from said back portion of said chair, and whereby once said carriage is positioned towards said back portion of said chair, the spatial distance between an operator seated in said chair and said device supporting surface remains essentially constant in a relationship determined by said position setting means as said chair is rocked about said first horizontal axis.

2. The work station of claim 1, further comprising:
   a second support surface upon which a second device is supportable, said second device-supporting surface being attached to said carriage.

3. The work station of claim 1, wherein a front edge of said means for supporting the thigh portion of a human rocks about said first horizontal axis through a range of approximately 20 degrees below the horizontal with to approximately 40 degrees above the horizontal.

4. A work station comprising:
   means for supporting a human operator in a seated position, said human supporting means having a first portion contactable by a thigh portion of the human anatomy and a second portion contactable by a back portion of the human anatomy, said human supporting means being rockable about a first horizontal axis;
   a carriage attaching means, one end of said carriage attaching means being secured proximate said first portion of said human supporting means;
   a carriage attached to said carriage attaching means and pivotable about a second horizontal axis positioned proximate the remaining end of said carriage attaching means, said carriage being pivotable from a first position farthest away from said back portion to a second position closest to said back portion of said human supporting means;
   means for supporting a first device, said first device supporting means being attached to said carriage; and,
   means for retaining the position of said carriage in said second position in a manner whereby a desired spatial distance separating said device supporting means from an operator seated in said human supporting means remains essentially constant as said human supporting means rocks about said first horizontal axis.

5. The work station of claim 4, further comprising:
   means for supporting a second device, said second device supporting means being attached to said carriage.

6. The work station of claim 4, further comprising:
   a foot rest positioned proximate said second horizontal axis.

7. A work station of claim 4, further comprising:
   an arm support means, said arm support means allowing said human operator's arm to rest in a range of positions, said arm support means following the natural horizontal range of motion of said arms.

8. A work station of claim 7, wherein said arm support means pivots about an axis positioned proximate said second portion of said human operator supporting means.

9. The work station of claim 4, wherein a front edge of said first portion of said human supporting means rocks about said first horizontal axis through a range of approximately 20 degrees below the horizontal to approximately 40 degrees above the horizontal.

10. A work station comprising:
chair for supporting a human operator in a seated position, said chair having means for supporting the thigh portion of a human, means for contacting the back portion of a human, and a side frame for positioning said back portion rearward relative to said thigh portion, said chair being rockable about a first horizontal axis located a predetermined distance above a floor proximate said thigh portion of said chair;
a carriage attaching means having one end attached to said side frame of said chair proximate the intersection of a first edge of said side frame proximate said thigh portion and a second edge of said side frame proximate said floor, the remaining end of said carriage attaching means having an extension portion which forms a stop block;
a carriage having one end attached to said carriage attaching means proximate said stop block, said first end of said carriage being shaped so as to have a first stopper edge and a second stopper edge, said carriage being pivotable about a second horizontal axis located proximate said extension portion of said carriage attaching means, said carriage pivoting about said second horizontal axis from a first position wherein said first stopper edge is proximate said stop block to a second position wherein said second stopper edge is proximate said stop block;
a support surface upon which a first device is supportable, said device-supporting surface being attached proximate a second end of said carriage; and,
means for retaining the position of said carriage in said second position with respect to said human supporting means in a manner whereby a desired spatial distance separating said device-supporting surface from said operator seated in said chair remains essentially constant as said chair rocks about said first horizontal axis.

11. The work station of claim 10, further comprising: means for supporting a second device, said second device supporting means being attached to said carriage.

12. The work station of claim 10, further comprising: a foot rest positioned proximate said second horizontal axis.

13. A work station of claim 10, further comprising: an arm support means, said arm support means allowing said human operator's arm to rest in a range of positions, said arm support means following the natural horizontal range of motion of said arms.

14. A work station of claim 13, wherein said arm support means pivots about an axis positioned proximate said second portion of said human operator supporting means.

15. The work station of claim 10, wherein a front edge of said means for supporting the thigh portion of a human rocks about said first horizontal axis through a range of approximately 20 degrees below the horizontal to approximately 40 degrees above the horizontal.

16. The work station of claim 10 wherein the pivoting range of said carriage from said first position to said second position is adjustable.

17. The work station of claim 1, further comprising arm support means connected to said means for supporting a back portion of a human.

18. The work station of claim 17, wherein said arm support means is pivotally connected to said means for supporting a back portion of a human at an axis located approximately half-way between the shoulder to seat surface distance for a 97.5 percentile male and 2.5 percentile female.

19. The work station of claim 7, wherein said arm support means is connected to said second portion of said human supporting means.

20. The work station of claim 19, wherein said support means is pivotally connected to said second portion of said human supporting means.

21. The work station of claim 20, wherein said arm support means is pivotally connected to said second portion of said human supporting means at an axis located approximately half-way between the shoulder to seat surface distance for a 97.5 percentile male and 2.5 percentile female.

22. The work station of claim 13, wherein said arm support means is pivotally connected to said chair.

23. The work station of claim 22, wherein said arm support means is pivotally connected to said chair at an axis located approximately half-way between the shoulder to seat surface distance for a 97.5 percentile male and 2.5 percentile female.

* * * * *